Patented Aug. 28, 1934

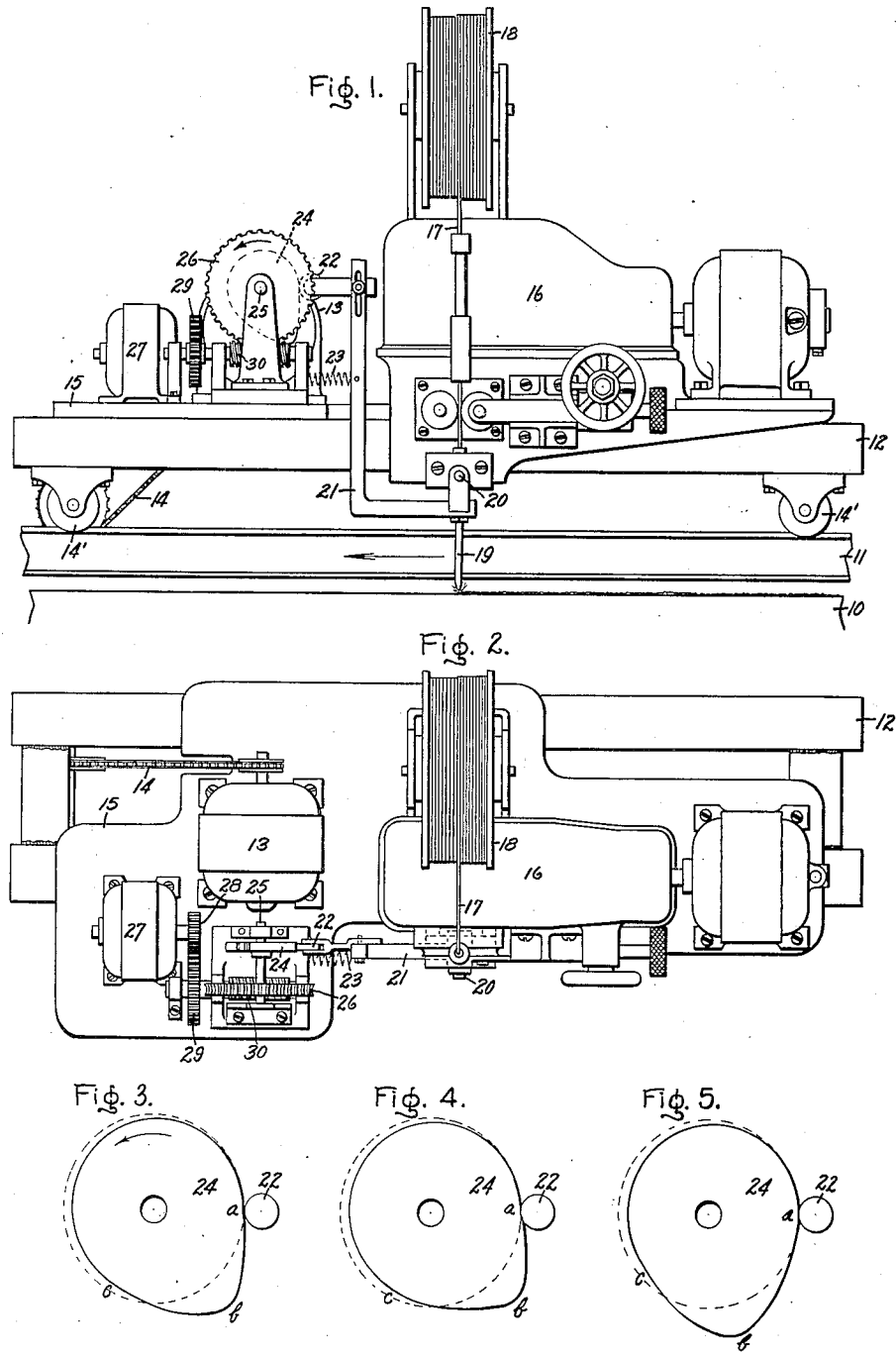

1,971,822

UNITED STATES PATENT OFFICE 1,971,822

WELDING APPARATUS

Pearce Klein, Schenectady, N. Y., assignor to General Electric Company, a corporation of New York Application July 31, 1931, Serial No. 554,301

7 Claims. (Cl. 219—8)

My invention relates to welding apparatus and more particularly to automatic welding machines in which the welding operation is periodically interrupted and alternated with a prewelding operation.

An object of my invention is to provide a machine for welding in succession predetermined lengths of a seam after each of these lengths has been prepared for the welding operation by a prewelding operation in which the welding agency is used to prepare the work for the welding operation.

Machines according to my invention are particularly suitable for welding galvanized articles in which during the prewelding operation a predetermined length of the galvanizing is burned off the work parts which are thereafter welded by the same agency, this operation being repeated successively to complete the weld. In performing such a welding operation the welding agency is moved a predetermined length ahead along the seam and back to its starting point at a speed greater than the welding speed in order to burn off the galvanizing and then advanced over this prepared section at a welding rate of speed in order to unite the parts by a welding operation. Thereafter the welding agency is again advanced over the work in advance of the weld just completed in the same manner above described to perform a second weld, this operation being continued until the seam is completely welded by means of the short sections thus welded in succession.

My invention, however, is not limited to machines for welding galvanized parts since its construction and organization is such as to render it suitable for performing other welding operations in which it is desirable to perform a prewelding or preheating operation immediately before a welding operation and by successively repeating these operations produce a line weld between articles to be joined. My invention may be applied to gas welding machines, arc welding machines, or gas-arc welding machines. For the purpose of illustrating my invention I have shown it in the attached drawing as applied to a metallic arc welding machine.

Figs. 1 and 2 of the drawing illustrate front and top views of the travel carriage of a welding machine constructed in accordance with my invention and Figs. 3, 4, and 5 illustrate cams for use in the machine illustrated in Figs. 1 and 2.

In the drawing only a portion of the welding machine is illustrated, it being understood that the work 10 is held by suitable clamps in a machine provided with track members 11 upon which a travel carriage 12 is supported. During the welding operation the welding carriage is moved along the track 11 over the work 10 by a travel motor 13 which is mechanically connected through a chain 14 and sprockets to one of the axles of the supporting wheels 14' of the travel carriage 12. The mechanical connection may be obtained through a worm gear and pinion or other suitable means. The travel motor 13 is supported upon the platform 15 of the travel carriage 12 upon which is also supported a welding head and an oscillating mechanism. The welding head 16 operates automatically to strike and maintain a welding arc by feeding welding material 17 from a reel 18 through a nozzle member 19. The nozzle member 19 is pivoted to the welding head at 20 so as to be capable of oscillation in the line of the weld. Attached to the nozzle member 19 is a bell crank member 21, the upper end of which is provided with a cam follower 22. This cam follower is held in engagement, by a spring 23 or other suitable means, with a cam 24 which is mounted on a shaft 25 which also serves as a support for a worm wheel 26. The worm wheel and cam are rotated by a motor 27 connected thereto through spur gears 28 and 29 and worm 30, or other suitable speed reducing means. The motor 27 is preferably an adjustable speed motor.

The contour of the cam 24 is such that as the travel carriage is traversed over the work at a uniform rate of speed the nozzle member 19 is given a discontinuous oscillating movement about its pivot 20 to periodically move the arcing terminal of the electrode repeatedly forward and back again to its point of starting for a predetermined length of the seam to be welded to prepare that portion of the seam for a subsequent welding operation performed by moving the arcing terminal of the electrode across the prepared portion of the work at a welding rate of speed. The time of advance and return of the arcing terminal of the electrode during the prewelding operation and the time of the welding operation may be adjusted by employing an adjustable cam or a plurality of variously shaped cams, three of which have been illustrated in Figs. 3, 4 and 5. In these figures the cam follower has been shown at 22 and the cam at 24. During the movement of the cam follower 22 along the surface of the cam 24 from the point $a$ to the point $b$ the arcing terminal of the electrode is quickly advanced a predetermined length along the work and during the movement of the follower 22 from b to c again returned to the point of starting. Point c is nearer to the center of the cam than point a, to take care of the forward travel of the arc due to the forward travel of the welding carriage 12. During the travel of the cam follower 22 from c to a the arcing terminal of the electrode is advanced along the work at a speed slightly greater than the speed of travel of the carriage 12 and at a speed sufficiently slow to perform a welding operation along the predetermined length of the seam prepared for welding by the operation resulting during the travel of the cam follower 22 from a to b to c. In Fig. 4 the time of quick advance ab has been shortened and in Fig. 5 lengthened. The time of return bc in Fig. 3 is about the same as the time of return bc in Fig. 5 and quicker than the time of return bc in Fig. 4. In each case, however, the welding period ca is essentially the same. It is apparent that the welding operation may be suitably varied to accommodate any desired welding operation by, employing a suitably shaped cam 24 so long as means are provided for imparting a discontinuous oscillating movement in the line of the weld to the welding agency which in the machine just described is the arcing terminal of a metallic electrode.

The machine illustrated in the drawing and described above constitutes one embodiment of my invention. It is apparent to those skilled in the art that various modifications may be made without departing from my invention since the construction of the oscillating mechanism illustrated and described may be variously modified, or equivalent arrangements employed for obtaining the desired oscillatory movement of the welding agency during its forward travel along the seam to be welded. The travel carriage itself may be suitably moved to perform this operation, although I prefer to employ the arrangement illustrated in which the oscillating mechanism is mounted on the travel carriage which is moved at a uniform rate over the work.

What I claim as new and desire to secure by Letters Patent of the United States, is,—

1. Welding apparatus comprising a welding agency, means for supporting said welding agency, and means for moving said welding agency forward and backward at a speed greater than the welding speed and then forward again at a welding speed along successive predetermined lengths of the line of welding.

2. Welding apparatus comprising a welding agency, means for moving said agency and the work to be welded relatively to one another to weld in succession predetermined lengths of a seam to be welded, and means for periodically interrupting the welding operation at the end of each predetermined length and alternating therewith a prewelding operation on the next predetermined length.

3. Welding apparatus comprising a welding agency, and means for welding in succession predetermined lengths of the seam to be welded, including means for moving said welding agency a predetermined length in the direction of welding and back again to its starting point at a speed greater than the welding speed, and thereafter advancing said welding agency over said predetermined length at a welding speed.

4. Welding apparatus comprising a welding agency, means for traversing said agency and the work relatively to one another at a substantially constant rate of speed and means for moving said welding agency a predetermined distance in the direction of welding and back again to its starting point at a speed greater than the welding speed and thereafter advancing said welding agency over said predetermined distance at a welding speed within the period of time required for traversing said welding agency and the work relatively to one another said predetermined distance.

5. Welding apparatus comprising a welding agency, means for traversing said agency and the work relatively to one another along a seam to be welded, means for pivotally supporting said welding agency for an oscillatory movement in the line of welding, and means for oscillating said welding agency during said traversing movement and for moving said welding agency forward and backward at a speed greater than the welding speed and then forward again at a welding speed along successive predetermined lengths of said seam.

6. Welding apparatus comprising a nozzle, means for feeding welding material through said nozzle, means for pivotally supporting said nozzle for movement in the line of welding and means for repeatedly moving the tip of said nozzle forward and backward in the direction of welding at a speed greater than the welding speed and then forward again at a welding speed.

7. Welding apparatus comprising a travel carriage, means for traversing said travel carriage and the work to be welded relatively to one another, a welding agency, means for pivotally supporting said welding agency on said carriage for movement in the direction of travel of said carriage, and means for oscillating said welding agency during said traversing movement and for moving said welding agency forward and backward at a speed greater than the welding speed and then forward again at the welding speed along successive predetermined lengths of the weld in the direction of travel of said carriage.

PEARCE KLEIN.